United States Patent [19]

Erhart

[11] Patent Number: 4,556,922
[45] Date of Patent: Dec. 3, 1985

[54] VCR WITH IMPROVED TAPE THREADING AND GUIDING

[75] Inventor: Georg Erhart, Vienna, Austria

[73] Assignee: U.S. Philips Corporation, New York, N.Y.

[21] Appl. No.: 403,379

[22] Filed: Jul. 30, 1982

[30] Foreign Application Priority Data

Sep. 8, 1981 [AT] Austria ............................ 3884/81
Mar. 11, 1982 [AT] Austria ............................ 978/82

[51] Int. Cl.$^4$ ............................................. G11B 15/66
[52] U.S. Cl. .................................... 360/85; 360/95
[58] Field of Search .................. 360/85, 95, 83–84, 360/93

[56] References Cited

U.S. PATENT DOCUMENTS

| | | | |
|---|---|---|---|
| 3,979,772 | 9/1976 | Umeda | 360/85 |
| 4,191,979 | 3/1980 | Poehler | 360/85 |
| 4,322,761 | 3/1982 | Reitler et al. | 360/85 |
| 4,323,936 | 4/1982 | Beltler et al. | 360/95 |
| 4,410,919 | 10/1983 | Umeda | 360/85 |

FOREIGN PATENT DOCUMENTS 0028928 5/1981 European Pat. Off. ............. 360/85

Primary Examiner—Stuart N. Hecker
Assistant Examiner—David J. Severin
Attorney, Agent, or Firm—David R. Treacy

[57] ABSTRACT

A magnetic tape recording apparatus comprises at least one tape-guide device (18, 18') which is movable between a rest position and an operating position and, for moving said device, a drive member (26, 26') which is coupled to a supporting member (19, 19') of the tape-guide device via a disengageable coupling (27, 27'). The drive member (26, 26') and the supporting member (19, 19') are tensioned relative to each other by means of a spring (45, 45') which acts in the direction of movement, the spring urging the coupling abutments (39, 39', 40, 40', 41, 41', 42, 42') of the disengageable coupling, which abutments are operative in the direction of movement, against each other when the tape guide device is out of its operating position. When the tape-guide device (18, 18') is in its operating position the spring (45, 45') keeps said device in engagement with a positioning device (46, 46') which positions the tape-guide device, the drive member (26, 26') being moved with overtravel relative to the supporting member (19, 19') and the coupling abutments of the disengageable coupling (27, 27') being disengaged from each other against the force of the spring (45, 45').

21 Claims, 12 Drawing Figures

U.S. Patent Dec. 3, 1985 Sheet 6 of 6 4,556,922
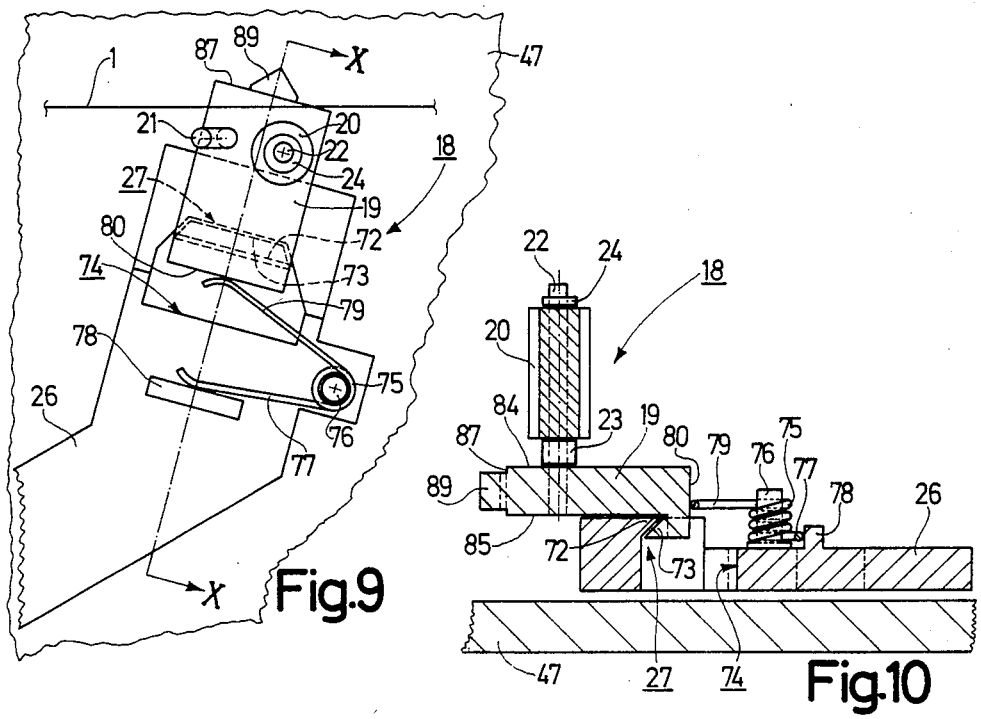
Fig.9
Fig.10
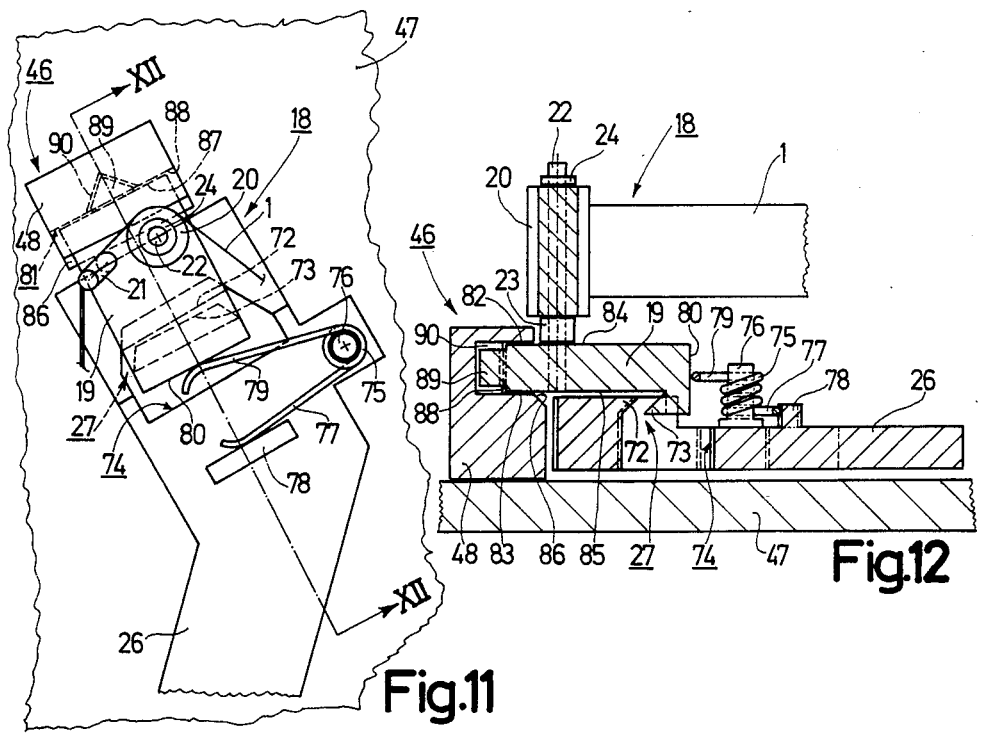
Fig.11
Fig.12

VCR WITH IMPROVED TAPE THREADING AND GUIDING

BACKGROUND OF THE INVENTION

The invention relates to a recording and/or reproducing apparatus for use in conjunction with a record carrier in the form of a tape, which apparatus comprises at least one tape-guide device which is movable between a rest position and an operating position along a predetermined path of movement. Such apparatus, such as a helical scan video cassette recorder (VCR), have at least one tape guide arranged on a supporting member, which is kept in force-sustained engagement with a positioning device for positioning it in its operating position. A drive member, which is drivable by a driving device, is coupled to its supporting member via a disengageable coupling which comprises facing abutments which act in the direction of movement of the tape-guide device, which are in force-sustained engagement with each other during a movement of the tape-guide device, and which are disengaged from each other in the operating position of the tape-guide device. Such apparatus is described for example, in U.S. Pat. No. 4,323,936.

In this known apparatus the disengageable coupling between the drive member and the supporting member exhibits lost motion so that after a movement of the tape-guide device between its rest position and its operating position the drive member does define the position of the supporting member and the tape guide arranged on it in an unambiguous manner. However, for a correct guidance of the record carrier it is essential that the position of the tape guide after its displacement is defined accurately. In order to define the position of the tape-guide supporting member upon a displacement of the tape-guide device the known apparatus therefore comprises a separate guide means for the supporting member, which guide means is constructed as a U-shaped trough with guide grooves. However, such a separate guide means leads to additional costs and also occupies a substantial amount of space. In the operating position of the tape-guide device the drive member and the supporting member are separated from each other thereby disengaging the coupling, after which the tape-guide device is positioned by means of a positioning device without being impeded and influenced by the drive member. For the force-sustained engagement of the tape-guide device, which is in its operating position, with the positioning device the known apparatus comprises a separate pressure device, which is also expensive, which requires more space, and which leads to a comparatively intricate construction.

SUMMARY OF THE INVENTION

To minimize these problems the invention aims at improving a VCR or other tape recorder in such a way that the drive member accurately defines the position of the supporting member of the tape-guide device directly without separate aids; and the force-sustained engagement of the tape-guide device with the positioning device is obtained without the use of a separate pressure device.

In a recorder according to the invention at least one spring acts between the drive member and the supporting member and tensions the drive member and the supporting member relative to each other substantially in the direction of movement, the coupling abutments always being in force-sustained engagement with each other when the tape-guide device is out of its operating position. This keeps the tape-guide device in force-sustained engagement with the positioning device when the tape-guide device is in its operating position, the drive member being moved with overtravel relative to the supporting member when the coupling is disengaged.

Since the spring keeps the coupling abutments of the disengageable coupling always in force-sustained engagement with each other when the tape-guide device is out of its operating position, thereby eliminating lost-motion between the coupling abutments, the drive member directly defines the position of the supporting member of the tape-guide device and the tape guide on this supporting member in an accurate and reliable manner. Therefore a separate guide means for the supporting member may be dispensed with. This results in a particularly simple and compact construction, which guarantees a correct and reliable guidance of the record carrier when the tape-guide device is moved between its rest position and its operating position.

When the tape-guide device is in its operating position the spring which acts between the drive member and the supporting member is also utilized for keeping the tape-guide device in force-sustained engagement with the positioning device, so that a separate pressure device may be dispensed with and the construction is also particularly simple, reliable and compact in this respect.

Since the drive member is moved with overtravel relative to the supporting member when the tape-guide device is in its operating position, the coupling abutments are then disengaged from each other, thereby disengaging the coupling between the drive member and the supporting member of the tape-guide device, and the supporting member is connected to the drive member through the spring only. In this way the tape-guide device is positioned in its operating position; substantially without being influenced and impeded by the drive member, by means of the positioning device; and is kept in force-sustained engagement with the tape-guide device by the spring.

In this respect it is to be noted that from U.S. Pat. No. 3,660,614, which describes a recording and/or reproducing apparatus comprising a tape-guide device which is movable between a rest position and an operating position, it is known to move a driving member for the tape-guide device with overtravel relative to a supporting member for a tape guide of this tape-guide device when this device is in its operating position, a spring which acts between the drive member and the supporting member being tensioned and keeping the tape-guide device in force-sustained engagement with a positioning stop. However, in this known apparatus, as distinct from the apparatus in accordance with the invention which is of the type mentioned in the opening paragraph, the supporting member is not coupled to the drive member by a disengageable coupling but is non-disengageably coupled through pivotal bearing means formed by a bearing pin. This construction has the disadvantage that in the operating position of the tape-guide device the supporting member cannot become disengaged from the drive member, so that in its operating position the tape-guide device cannot be positioned without being influenced and impeded by the drive member because the position of the supporting member always depends on the position of the drive member. This has an adverse effect on the accuracy and reproductibility with which the tape-guide device is positioned.

The spring which acts between the drive member and the supporting member may, for example, be a spring clip made of spring wire; alternatively, a leaf spring or a helical compression spring may be used. If required more than one spring may be used. However, it is found to be particularly advantageous if the spring is a helical spring which is loaded in tension and which is tensioned substantially in the direction of movement, the ends of the spring being attached to the drive member and to the supporting member respectively. The use of such a helical spring is found to be advantageous for a compact construction and a simple mounting procedure.

For the disengageable coupling between the drive member and the supporting member various constructions may be used. As an example, coupling may be effected by means of a single pair of coupling abutments, whose cooperation with each other is based on their shapes and which thus define the position of the supporting member relative to the drive member. However, it is found to be advantageous if for coupling the supporting member to the drive member there are provided two pairs of coupling abutments which are spaced from each other in the direction of movement of the tape-guide device. This yields a stable coupling of two members and it also results in the position of the supporting member relative to the drive member when the tape-guide device is not in its operating position being defined accurately by the two pairs of coupling abutments.

In this respect it is also found to be advantageous if in addition, the two pairs of coupling abutments are spaced from each other transversely of the direction of movement of the tape-guide device. This results in a maximum distance between the two pairs of coupling abutments, which is of advantage for an accurately defined position of the supporting member relative to the drive member when the tape-guide device is out of its operating position.

The pairwise cooperating coupling abutments may be constructed in various manners. As an example, at least one pair of coupling abutments may comprise two conical or two hemispherical abutments. It is found to be advantageous if one pair of coupling abutments comprises one coupling abutment formed with a substantially V-shaped recess, the other coupling abutment being a cylindrical pin which engages the V-shaped recess. This results in a simple and wear-resistant construction of the pair of coupling abutments, guaranteeing an accurately defined position of the supporting member relative to the drive member when the tape-guide device is out of its operating position.

Further, it is found to be advantageous if the other pair of coupling abutments comprises one coupling abutment in the form of a flat abutment surface, the other coupling abutment being a cylindrical pin which cooperates with the flat abutment surface, because this also leads to a very simple construction for the second pair of coupling abutments.

It is found to be particularly advantageous if the two cylindrical pins are both arranged on one of the two members to be coupled through the disengageable coupling and the V-shaped recess and the flat abutment surface are formed on the other one of the two members to be coupled. This simplifies the manufacture, because the two pins on the one hand and the recess and the abutment surface on the other hand can both be formed in one operation on the relevant of one of the two members to be coupled.

Further, it is found to be advantageous if the drive member is plate-shaped and the V-shaped recess and the flat abutment surface are formed by bounding walls of at least one aperture formed in the plate-shaped drive member, through which aperture the cylindrical pins on the supporting member extend. This is of advantage for a compact construction. The V-shaped recess and the flat abutment surface can be formed very simply in the plate-shaped drive member, for example by punching out the relevant aperture.

It is also found to be advantageous if a coupling abutment in the form of a cylindrical pin on one of the two members to be coupled by the disengageable coupling has a hook-shaped free end which engages with the other one of two members to be coupled. This results in a particularly reliable connection of the supporting member to the drive member, which substantially excludes an inadvertant disengagement of the supporting member from the drive member in the direction in which the cylindrical pins extend.

In an apparatus as known from Austrian Pat. No. 362,161, to which U.S. Pat. No. 4,323,936 referred to above corresponds, in which the positioning device for the tape-guide device comprises an abutment which is operative substantially in the direction of movement of the tape-guide device, it is found advantageous if, in accordance with the invention, the positioning-device abutment which is operative in the direction of movement, forms a fulcrum for the tape-guide device, about which the tape-guide device is pivotable in at least one pivoting direction substantially transversely of the direction of movement, if the spring which acts on the supporting member of the tape-guide device pivots the tape-guide device which is in its operating position about the fulcrum, and if for positioning the pivoted tape-guide device the positioning device and the tape-guide device comprise at least two pairs of positioning abutments which are operative substantially in the same direction in which the tape-guide device is pivoted about the fulcrum, which are spaced from each other, and which cooperate with each other. In this way it is achieved that for positioning the tape-guide device in its operating position the spring which acts on the supporting member of the tape-guide device also causes the tape-guide device to pivot in at least one pivoting direction about the fulcrum formed by the abutment of the positioning device and that during this pivotal movement the positioning abutments which are operative in the pivoting direction abut with each other in pairs. When these positioning abutments abut with each other no relative sliding movement occurs between the individual pairs of positioning abutments, which is of advantage for eliminating the influence of friction between the positioning abutments, for minimal wear and, consequently, a long lifetime and for an accurate positioning.

In this respect it is found to be advantageous if the abutment which forms a fulcrum for the tape-guide device and which is operative in the direction of movement is formed by one positioning abutment of a pair of positioning abutments provided on the positioning device. Thus, it is no longer necessary to provide a separate abutment as fulcrum, which is simple and saves space.

It is also found to be advantageous if for limiting a movement of the supporting member relative to the drive member when the tape-guide device is out of its operating position and, the coupling is at least partly disengaged against the force of the spring, there if provided at least one pair of cooperating limiting stops, one limiting stop of the pairwise cooperating limiting stops being arranged on the supporting member. As a result of this a movement of the supporting member relative to the drive member when the tape-guide device is out of its operating position and has consequently not yet been positioned by the positioning device is limited to a predetermined range in a very simple and reliable manner, which precludes for example an inadvertent complete disengagement of the supporting member from the drive member.

In this respect it is found to be advantageous if the other limiting stop of at least one pair of limiting stops is arranged on the drive member. This leads to a particularly simple and compact construction, whilst a movement of the supporting member relative to the drive member is limited independently of the instantaneous position of the tape-guide device during its displacement.

It is also found to be advantageous if the other limiting stop of at least one pair of limiting stops is a stationary stop arranged on the apparatus in the path of movement of the tape-guide device. Such a limiting stop on the apparatus can be constructed in a very stable manner and is therefore also capable of taking up comparatively great forces occurring the relative movement is thus limited.

In view of a simple construction it is found to be advantageous if the other limiting stop is formed as a stop surface which extends along substantially the entire path of movement of the tape-guide device. A movement of the supporting member relative to the drive member is then also limited independently of the instantaneous position of the tape-guide device during its displacement.

Two embodiments of the invention will be described in more detail, by way of a non-limitative example, with reference to the drawings.

BRIEF DESCRIPTION OF THE DRAWING

FIG. 9, in the same way as FIG. 3, shows a tape-guide device of a second embodiment of the invention in its rest position, the supporting member of this tape-guide device being disengageably coupled to the associated drive member via a pair of coupling abutments and the members being tensioned relative to each other by means of a spring clip.

FIG. 10 is a sectional view of the tape-guide device shown in FIG. 9 taken on the line X—X in FIG. 9.

FIG. 11, in the same way as in FIG. 9, shows the tape-guide device shown in FIGS. 9 and 10 in its operating position.

FIG. 12 shows the tape-guide device shown in FIG. 11 in its operating position in a sectional view taken on the line XII—XII in FIG. 11.

DESCRIPTION OF THE PREFERRED EMBODIMENTS

Figure 1:
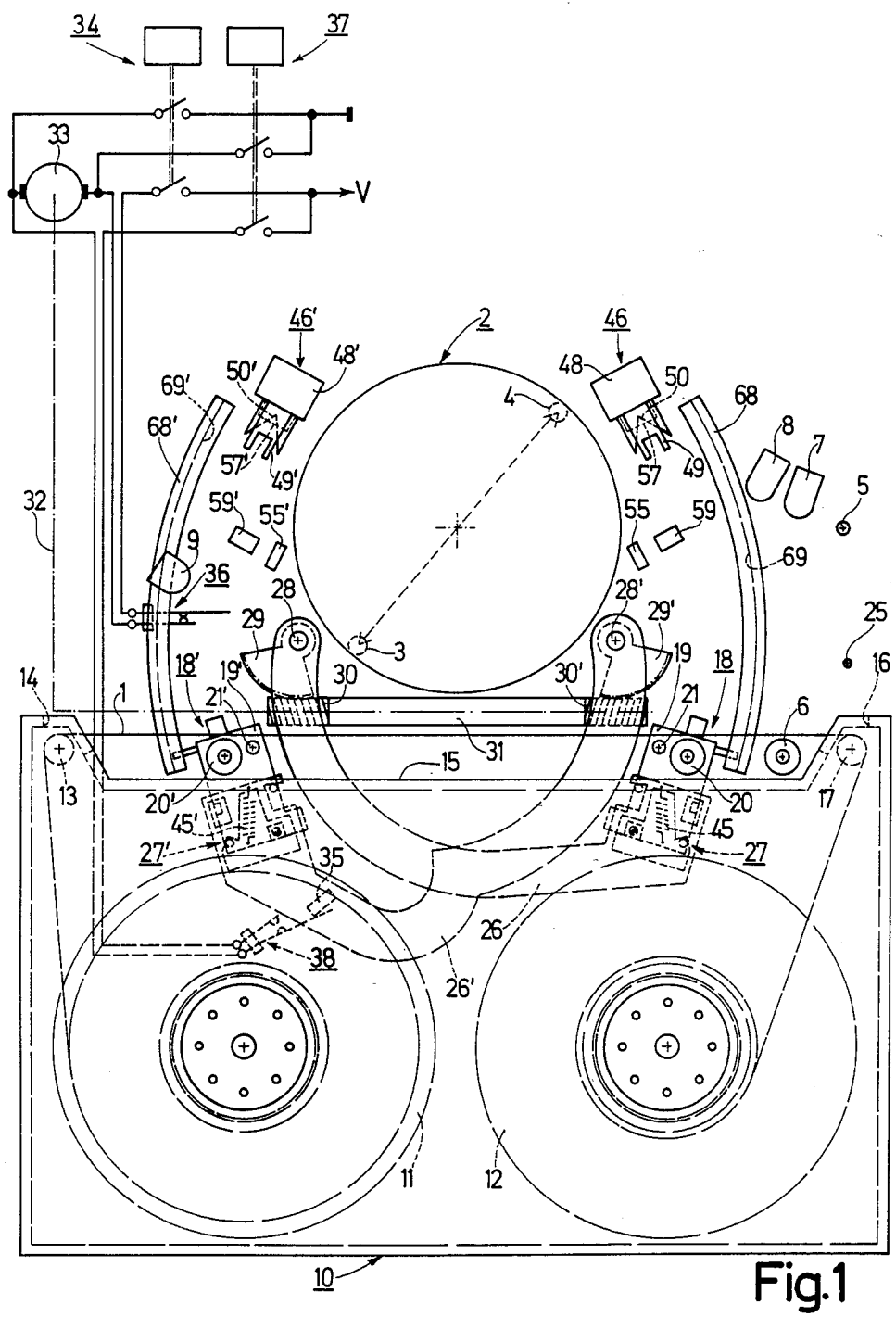
FIG. 1 is a schematic plan view of the relevant parts of a first embodiment of the invention, a VCR having two tape-guide devices whose supporting members are each disengageably coupled to the associated drive members via two pairs of coupling abutments, which members are tensioned relative to each other by means of a helical tension spring, the tape-guide devices being shown in their rest positions.
Figure 2:
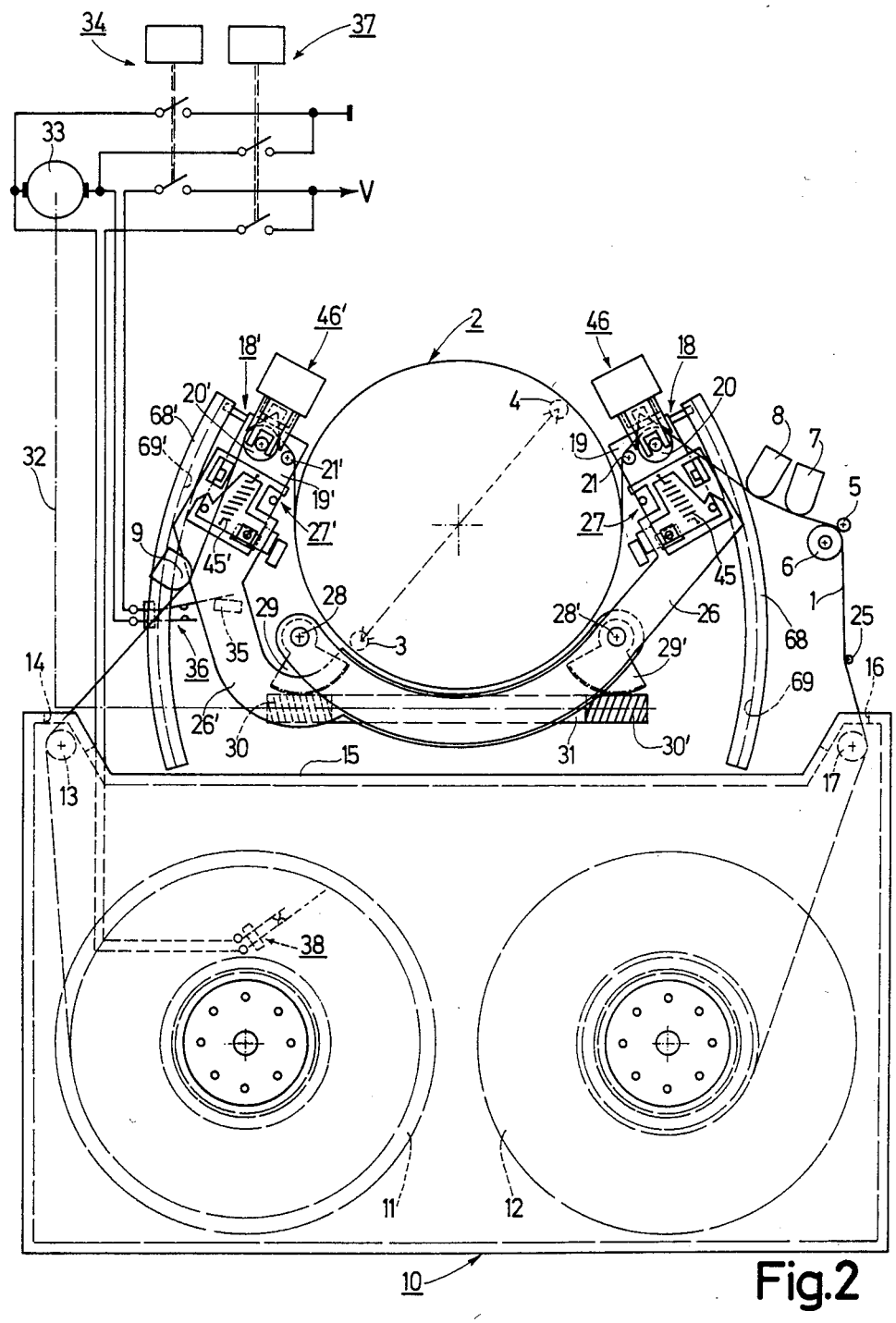
FIG. 2 is a similar view of the apparatus of FIG. 1, the two tape-guide devices being shown in their operating positions.

FIGS. 1 and 2 schematically show a portion of a VCR using a cassette containing a magnetizable record carrier 1 in the form of a tape, hereinafter simply referred to as "tape". The apparatus comprises a tape-guide drum 2, around whose circumferential surface the tape 1 can be wrapped in a helical path of substantially 180°. Two schematically shown rotary magnetic heads 3 and 4 are arranged inside the tape guide drum 2, which is divided into substantially two drum halves, by a gap through which the heads co-operate with the tape 1 which has been wrapped around the drum and scan the moving tape along tracks which are inclined relative to its longitudinal direction, the magnetic heads recording television signals on or reproducing such signals from the tape. For the transport of the tape 1 which has been wrapped around the tape-guide drum 2, the apparatus comprises a capstan 5 against which the tape can be pressed by a pressure roller 6 which is movably arranged in the apparatus in a manner not shown.

Further, the apparatus comprises a stationary magnetic head 7 by means of which a longitudinal track on the tape 1 can be scanned and by means of which an audio signal associated with the television signals can be recorded. Adjacent the magnetic head 7 a second stationary magnetic head 8 is arranged, by means of which the same track as scanned by the magnetic head 7 can be scanned for erasing audio signals recorded in this track. A further stationary magnetic head 9 is mounted on the opposite side of the drum 2 for simultaneously erasing both the television signals recorded in the inclined tracks and the associated audio signal recorded in the track which extends in the longitudinal direction of the tape.

As can be seen in FIGS. 1 and 2, the tape 1 is contained in a substantially rectangular cassette 10 whose housing comprises two major walls and four side walls, which cassette can be inserted into the apparatus and which contains the tape on adjacent rotatably journalled and rotatably drivable reels 11 and 12 between which the tape 1 extends. Inside the cassette the tape 1 extends from the first reel 11, which serves as supply reel, to a first guide roller 13, from this roller through a first aperture 14 in the trough-shaped side wall 15, then outside the cassette housing along the side wall 15, and subsequently through a second aperture 16 in the side wall 15 to a second guide roller 17 and from this roller to the second reel 12, which serves as take-up reel. For protecting the length of tape 1 which extends outside the cassette housing along the side wall 15 the cassette 10 has a cassette cover which upon insertion of the cassette into the apparatus automatically exposes the length of tape which extends outside the cassette housing, but which is not shown for the clarity and simplicity of the drawing because it is irrelevant to the present invention.

Figure 4:
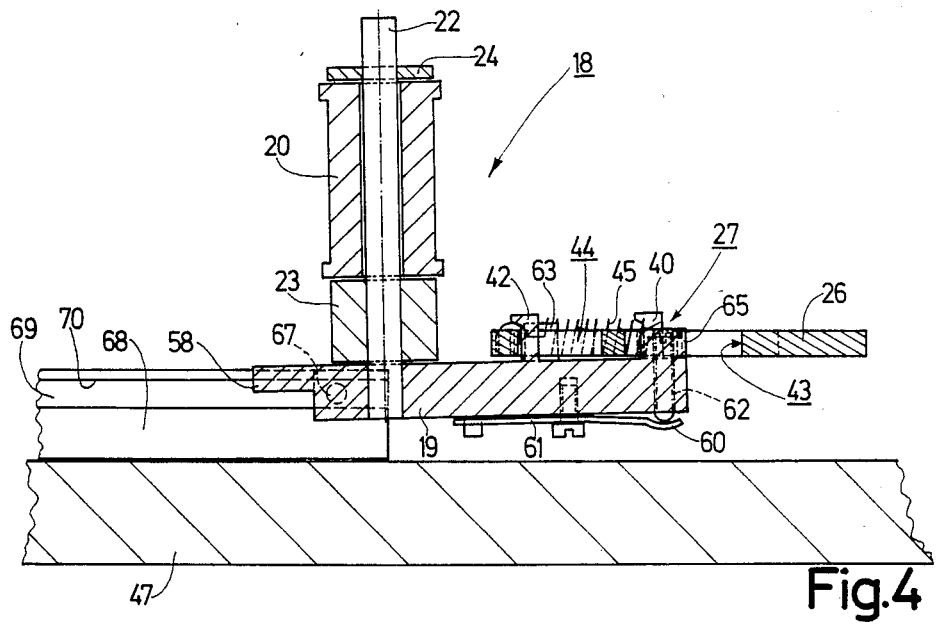
FIG. 4 is a sectional view of the tape-guide device shown in FIG. 3, taken on the line IV—IV in FIG. 3.
Figure 6:
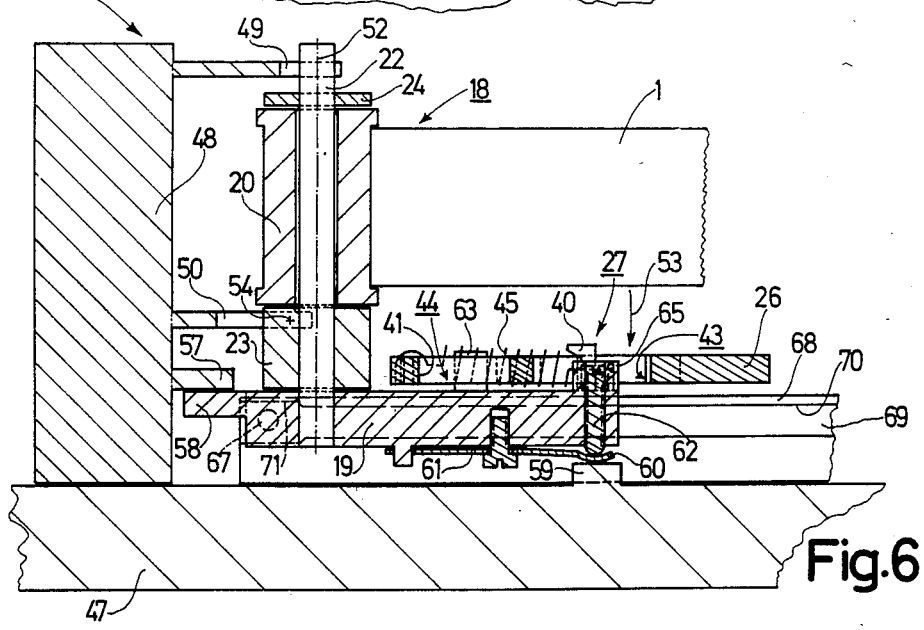
FIG. 6 is a sectional view of the tape-guide device shown in FIGS. 3, 4 and 5 taken on the line VI—VI in FIG. 5.

For withdrawing the tape 1 from the cassette 10, wrapping it around the tape-guide drum 2 and returning it into the cassette the apparatus comprises two tape-guide devices 18 and 18' which are movable between a rest position and an operating position along a predetermined path of movement and which are identical. For this reason corresponding parts are designated by reference numerals which are the same but primed. Each tape-guide device 18, 18' comprises a substantially block-shaped supporting member 19, 19', on which a rotatable tape-guide roller 20, 20' and adjacent this roller a stationary tape guide pin 21, 21' are arranged as tape guides. As can be seen in FIGS. 4 and 6, the tape guide roller 20, 20' is journalled on the supporting member 19, 19' by means of a spindle 22, 22' which is pressed into the supporting member 19, 19' and onto which a spacer 23, 23' is mounted so that it cannot be rotated. The tape-guide roller 20, 20', which is provided with flanges and which is rotatable about the spindle, is arranged adjacent the spacer 23, 23' and is retained on the spindle by means of a retaining ring 24, 24' fitted onto this spindle. The tape-guide pin 21, 21' is pressed into the supporting member 19, 19' in the same way as the spindles 22, 22' of the tape-guide rollers 20, 20'. It will be appreciated that other methods of mounting the tape-guide roller and the tape-guide pin may be used.

As already stated, the two tape-guide devices 18, 18' are each movable between a rest position, shown in FIG. 1, and an operating position, shown in FIG. 2. When the two tape-guide devices 18, 18' are in the rest position shown in FIG. 1, the tape guides 20, 20' and 21, 21' are located behind the tape 1 which extends inside the cassette along the side wall 15 of the cassette housing. It is then essential that the tape-guide devices are always in an accurately defined position, in order to ensure a reliable and correct co-operation with the tape.

When the tape-guide devices 18, 18' are moved to their operating positions the tape is taken along by the tape guides 20, 20' and 21, 21', so that of course at least one of the two reels 11 or 12 should be allowed to rotate in order to unwind the tape. It is essential that the tape-guide devices are then also in an accurately defined position, in order to guarantee a reliable and correct threading of the tape.

When the tape-guide devices 18, 18' are in their operating positions the tape 1 will take the path shown in FIG. 2. The tape 1 then extends from the reel 11, via the guide roller 13, the magnetic head 9, the tape-guide roller 20' and the tape-guide pin 21' of the tape-guide device 18', the tape-guide drum 2, the tape-guide pin 21 and the tape-guide roller 20 of the tape-guide device 18, the magnetic head 8, the magnetic head 7, the capstan 5 and the pressure roller 6, a further tape-guide pin 25 on the apparatus and the guide roller 16 to the reel 12. As already stated, the tape guides 20, 20' and 21, 21' keep the tape 1 wrapped around the tape-guide drum 2 in the operating positions of the tape-guide devices 18, 18', so that the path of the tape 1 around the tape guide drum 2 is defined by the tape-guide devices 18, 18'. For the sake of completeness it is to be noted that the tape-guide drum 2 and the tape guide pins 21, 21' are inclined relative to the other parts which co-operate with the tape, in order to obtain the said helical path of the tape 1 on the tape-guide drum 2, but for the sake of simplicity this is not shown in FIGS. 1 and 2 but only in FIGS. 3, 5, 7 and 8 for the tape guide post 21. Since it is essential for a correct recording or reproducing process that the tape is always wrapped around the tape-guide drum in a precise and accurately reproducible manner, the tape guide devices which determine this path should occupy an accurately defined operating position.

In order to return the tape into the cassette 10 the tape-guide devices 18, 18' are set from their operating positions to their rest positions, so that of course at least one of the two reels should be driven so as to take up the tape 1. The tape 1 then again co-operates with the tape-guide devices, so that during this movement the tape-guide devices should also occupy an accurately defined position in order to guarantee a correct and gentle co-operation with the tape. In order to meet all these stringent requirements in a simple, space-saving and reliable manner the apparatus is constructed as described hereinafter.

For moving the tape-guide devices 18, 18' between their rest positions and their operating positions a drive member in the form of a pivotable curved arm 26, 26' is coupled to the supporting member 19, 19' of each tape-guide device through a disengageable coupling 27, 27' at a plate-shaped end of the arm 26, 26'. Each arm 26, 26' is pivotally mounted on a spindle 28, 28' which is rotatably journalled in the apparatus. For pivoting the two arms 26, 26' a worm-wheel segment 29, 29' is arranged on each spindle 28, 28', which segment is in mesh with a worm 30, 30', the worm 30 having a right-hand lead and the worm 30' a left-hand lead and both worms being mounted on one spindle 31. The spindle 31 can be driven by a motor 33, as is schematically indicated by a dash-dot line 32.

By actuating a first switching device 34 the motor 33 can be connected to a power supply V with such a polarity that it drives the spindle 31 in the counterclockwise direction, so that because of the opposite leads of the two worm gears the worm-wheel segment 29 and the arm 26 which is rigidly connected thereto are pivoted counterclockwise, and the worm-wheel segment 29' and the arm 26 which is rigidly connected thereto are pivoted clockwise. In this way, the tape-guide deviced 18, 18', which are disengageably coupled to the arms 26, 26', are movable from their rest positions to their operating positions for setting the tape-guide devices to their operating positions. This pivotal movement of the two levers 26, 26' is discontinued in that a projection 35 arranged on the arm 26' co-operates with a first end-position switch 36, which switch is then opened and interrupts the circuit for the motor 33 which had been closed upon actuation of the first switching device 34. As a result of this the motor 33 stops, so that the two arms 26, 26' are retained in their positions defined by the state of the first end-position switch 36 through the two worm-gear mechanisms because of the self-braking action of these mechanisms, the tape-guide devices 18, 18' occupying their operating positions.

Upon actuation of the second switching device 37 the motor 33 is connected to a power supply V with a polarity opposite to the aforementioned polarity, after which it drives the spindle 31 in the clockwise direction. In this way the arm 26 can be pivoted clockwise and the arm 26' anit-clockwise through the two worm gears, so that the two tape-guide devices 18, 18' are pivoted from their operating positions to their rest positions. These pivotal movements of the two arms 26, 26' are stopped when the projection 35 arranged on the arm 26 co-operates with a second end-position switch 38, which is then opened. Opening the switch 38 interrupts the circuit for the motor 33, which had been closed upon actuation of the second switching device 37. The motor 33 then stops, the two arms 26, 26' being retained in their positions in which the tape-guide devices 18, 18' occupy their rest positions. These rest positions remain defined by the state of the second end-position switch 38 as a result of the self-braking action of the two worm-gear mechanisms.

In this embodiment disengageable coupling 27, 27' between each of the two curved arms 26, 26' and the relevant block-shaped supporting member 19, 19' comprises two pairs of coupling abutments 39, 39', 40, 40' and 41, 41', 42, 42' which are spaced from each other in the direction of movement of the relevant tape-guide device 18, 18' and which are also spaced from each other transversely of the direction of movement, so that the two pairs are situated as far as possible from each other. The coupling abutments 39, 39' and 40, 40' as well as the coupling abutments 41, 41' and 42, 42' are arranged pairwise opposite each other and are operative in the direction of movement of the relevant tape-guide device 18, 18'. One pair of coupling abutments 39, 39' and 40, 40' comprises a V-shaped aperture 39, 39' in a plate-shaped end portion of the arm 26, 26' as the one coupling abutment, the other coupling abutment being a cylindrical pin 40, 40' which is arranged on the supporting member 19, 19' and has a circular cylindrical circumferential surface engaging the V-shaped recess 39, 39'. The other pair of coupling abutments 41, 41' and 42, 42' comprises a flat abutment surface 41, 41' on the plate-shaped end portion of the arm 26, 26' as the one coupling abutment, the other coupling abutment being another cylindrical pin 42, 42' which is also arranged on the supporting member 19, 19' and whose circumferential surface engages with the flat abutment surface 41, 41'.

Thus, in this embodiment the two cylindrical pins 40, 40' and 42, 42' are both arranged on one of the two members 19, 19' and 26, 26' which are to be coupled through the disengageable coupling 27, 27'; and the V-shaped recess 39, 39' and the flat abutment surface 41, 41' are arranged on the other one of the two members to be coupled. This arrangement provides an efficient and simple mounting or manufacturing process.

The V-shaped recess 39, 39' is formed by two converging bounding walls of a first aperture 43, 43' formed in the plate-shaped portion of the arm 26, 26'. The flat abutment surface 41, 41' if formed by a bounding of a second aperture 44, 44' formed in the plate-shaped portion of the arm 26, 26'. The two cylindrical pins 40, 40' and 42, 42' extend through the two apertures 43, 43' and 44, 44' and each have an overhanding shoulder or hook-shaped free end, with which they engage the arm 26, 26', which can be seen in FIGS. 4 and 6. Thus, the supporting member 19, 19' can be mounted simply on the relevant arm 26, 26', the hook-shaped ends of the cylindrical pins preventing the supporting member from being detached from the relevant lever in the axial direction of the cylindrical pins.

A spring 45, 45' acts between each arm 26, 26', which functions as a drive member, and the supporting member 19, 19' coupled to the arm through the disengageable coupling 27, 27'. The spring 45, 45' tensions the arm 26, 26' and the drive member 19, 19' relative to each other substantially in the direction of movement of each tape-guide device 18, 18'. The spring 45, 45' is a helical spring which is loaded in tension, which is tensioned substantially in the direction of movement, and whose two ends are attached to the arm 26, 26' and to the supporting member 19, 19' respectively, the spring being disposed mainly in the first aperture 43, 43' formed in the arm 26, 26'. An advantage of such a tension spring is that it occupies little space and can be mounted very simply.

The spring 45, 45' ensures that the pairwise co-operating coupling abutments 39, 39', 40, 40' and 41, 41', 42, 42' of the disengageable coupling 27, 27' are in force-sustained engagement with each other when the tape-guide device 18, 18' is out of its operating position, without the occurrence of back lash between the pairwise co-operating coupling abutments. Thus the coupling abutments, which are always in force-sustained engagement with each other as a result of the spring 45, 45' when the tape-guide device is out of its operating position, ensure that the supporting member 19, 19' is maintained in a predetermined position on the relevant arm 26, 26' in an accurate and reliable manner without separate aids, as can be seen in particular in FIGS. 3 and 4. This ensures that in the rest positions the tape-guide devices 18, 18' engage behind the tape in an absolutely reliable manner, and when the tape-guide devices are being moved from their rest positions to their operating positions the tape is guided correctly and gently. As the two pairs of coupling abutments are disposed at a maximum distance from each other the position of the supporting member on the relevant arm is defined in a particularly stable and exact manner.

Figure 3:
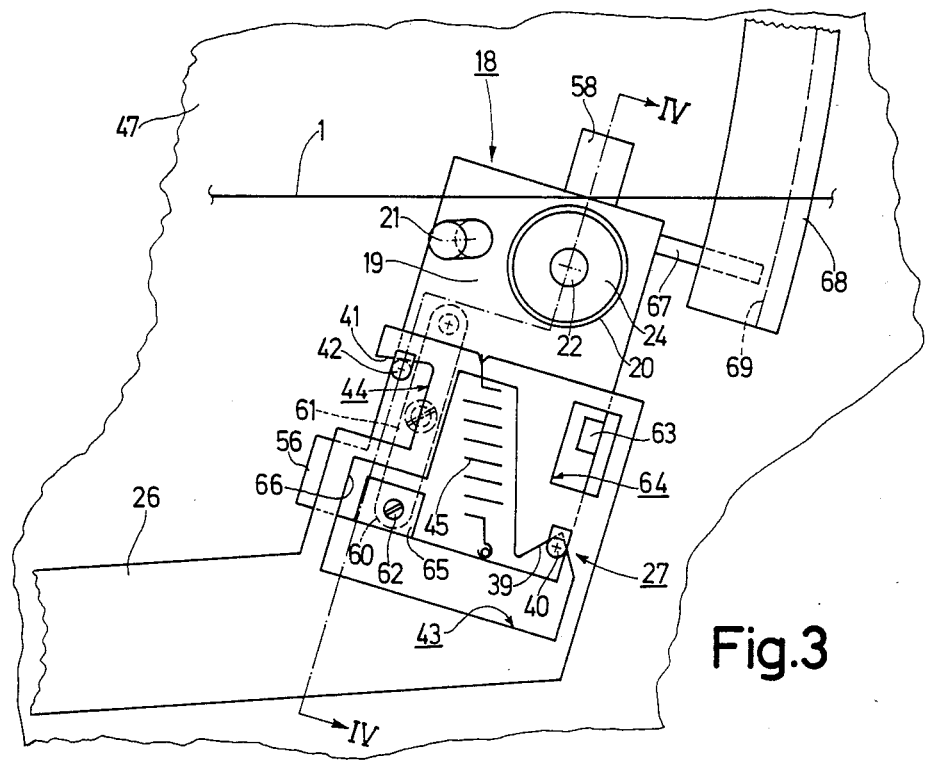
FIG. 3 is a detail of FIG. 1 at a larger scale showing one of the two tape-guide devices in its rest position.
Figure 5:
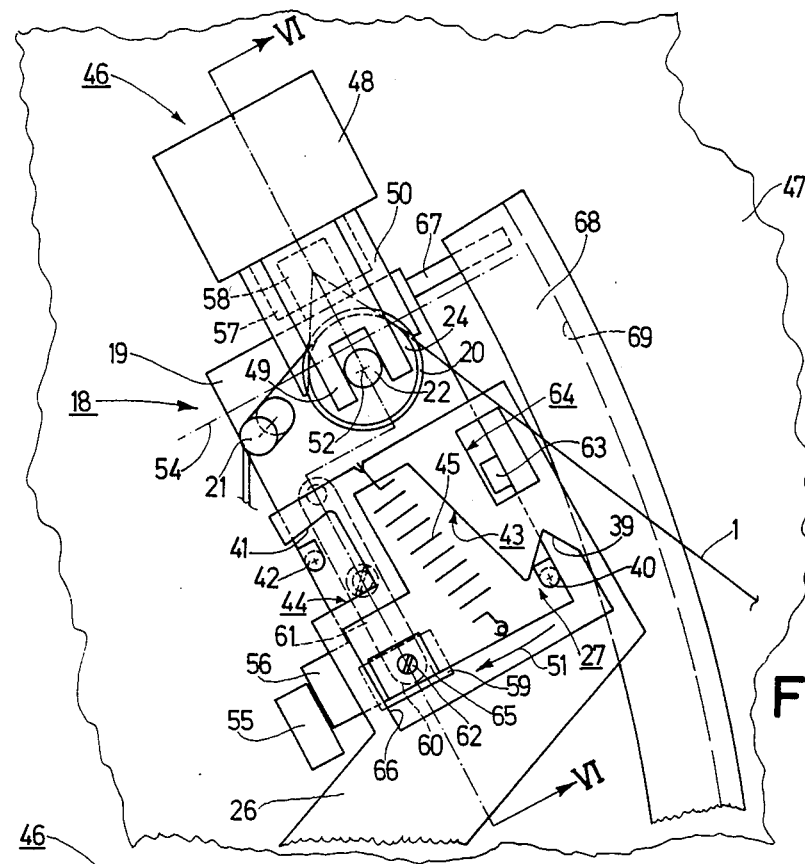
FIG. 5 is a detail of FIG. 2 on an enlarged scale, showing the tape-guide device also shown in FIGS. 3 and 4 in its operating position.

As already stated, the tape-guide devices 18, 18' can be moved out of their rest positions, shown in FIGS. 1, 3 and 4, to their operating positions, shown in FIGS. 2, 5 and 6, by the motor 33 through the oppositely acting worms 30, 30', the worm-wheel segments 29, 29', and the arm 26, 26' upon actuation of the first switching device 34. During this movement the arms 26, 26' drive the supporting members 19, 19' of the tape-guide devices 18, 18', the pairwise co-operating coupling abutments 39, 39', 40, 40' and 41, 41', 42, 42' being always in force-sustained engagement with each other under the influence of the springs 45, 45' during normal operation.

When the operating positions of the tape-guide devices 18, 18' are reached these devices each cooperate with a positioning device 46, 46' for positioning these devices. As soon as the tape-guide devices 18, 18' abut with their positioning devices 46, 46' a further movement of the tape-guide devices is not possible. However, the arms 26, 26' are still driven by the motor 33 until the projection 35 on the arm 26' actuates the first end-position switch 36 and thereby opens this switch. The motor 33 then stops and the arms 26, 26' are retained in their positions defined by the first end-position switch 36 as a result of the self-braking action of the worm-gear mechanism. This means that when the tape-guide devices 18, 18' are in their operating positions the arms 26, 26' perform a specific covertravel relative to the supporting members 19, 19' of the tape-guide devices, as can be seen in FIGS. 2, 5 and 6.

As a result of the overtravel of the arms 26, 26' which act as drive members relative to the supporting members 19, 19', the disengageable couplings 27, 27' are disengaged. The pairwise co-operating coupling abutments, which are operative in the direction of movement, 39, 39', 40, 40' and 41, 41', 42, 42' of the disengageable couplings 27, 27' are lifted off each other and at the same time the springs 45, 45' which act between the arms 26, 26' and the supporting members 19, 19' are tensioned further. Upon disengagement of the couplings 27, 27' the supporting members 19, 19' of the tape-guide devices 18, 18' are connected to the relevant arms 26, 26' through the springs 45, 45' only, which in an advantageous manner ensures that the arms do not disturb the positions and the orientation of the tape-guide devices. However, as can also be seen in FIGS. 2, 5 and 6, the springs 45, 45' are now also used for keeping the tape-guide devices 18, 18', which are in their operating positions, in force-sustained engagement with the positioning devices 46, 46'; thus, the springs 45, 45' serve several purposes.

The positioning of the tape-guide devices 18, 18' in their operating positions by means of the positioning devices 46, 46' is shown in detail in FIGS. 5 and 6. The positioning devices 46, 46' each comprise a positioning block 48, 48' arranged on a deck plate 47 of the apparatus. Each positioning block 48, 48' carries a U-shaped positioning abutment 49, 49', which during the movement of the tape-guide device 18, 18' to its operating position engages with that free end of the spindle 22, 22' of the tape-guide roller 20, 20' which is remote from the supporting member 19, 19' just before the operating position is reached. The two limbs of the U-shaped positioning abutment 49, 49' then enclose the spindles 22, 22', which is the first step in positioning the tape-guide device 18, 18'. It is to be noted that the transverse portion of the U-shaped positioning abutment 49, 49' does not contact the spindle 22, 22'; nor does this happen during other stages in the process of positioning the tape-guide device.

Each positioning block 48, 48' further comprises a V-shaped further positioning abutment 50, 50', which upon a further movement of the tape-guide device 18, 18' towards its operating position engages the cylindrical spacer sleeve 23, 23' mounted on the spindle 22, 22' of the tape-guide roller 20, 20'. The spacer 23, 23' then abuts the two converging locating surfaces of the V-shaped positioning abutment 50, 50' which is operative in the direction of movement of the tape-guide device, which is the second stage in positioning the tape-guide device 18, 18'. After this second stage of positioning the tape-guide device 18, 18' the inclination of the tape-guide device in a plane which is perpendicular to the direction of movement is defined. Until the instant at which the spacer 23, 23' abuts the V-shaped positioning abutment 50, 50', the supporting member 19, 19' is coupled to the arm 26, 26' through the coupling 27, 27', the pairwise co-operating coupling abutments 39, 39', 40, 40' and 41, 41', 42, 42' being urged against each other under the influence of the spring 45, 45'. At this instant the position of each tape-guide device 18, 18' is therefore determined not only by the positioning abutments 49, 49' and 50, 50' of the positioning device 46, 46' but also by the respective arm 26, 26'.

As already stated, the arms 26, 26' are moved with overtravel relative to the supporting members 19, 19', upon which the disengageable couplings 27, 27' are disengaged and the pairwise co-operating coupling abutments are lifted off each other against the force of the springs 45, 45'. However, the position of the tape-guide devices 18, 18' is then no longer determined by the arms 26, 26', for which reason the positioning is then effected as follows by the positioning devices 46, 46'.

After the couplings 27, 27' have become disengaged the supporting members 19, 19' can be moved without being impeded and influenced by the arms 26, 26', the springs 45, 45' which are attached to the arms 26, 26' exerting such a force on the supporting members 19, 19' that the spacers 23, 23' on the tape-guide devices 18, 18' are maintained in engagement with the V-shaped positioning abutments 50, 50'. Each of the V-shaped positioning abutments 50, 50' then forms a fulcrum for the tape-guide device which is in force-sustained engagement with this fulcrum via the spacer 23, 23'. In the present case each tape-guide device 18, 18' is pivotable about the fulcrum formed by the V-shaped locating stops 50, 50' in two pivoting directions which extend substantially transversely of the direction of movement. A pivotal movement in the pivoting direction of the arrow 51, 51', transverse to the direction of movement, is obtained by pivoting the tape-guide device 18, 18' about a pivotal axis 52, 52', which coincides with the axis of the spindle 22, 22' of the tape-guide roller 20, 20'.

A further pivotal movement in the pivoting direction of the arrow 53, 53' and transverse to the direction of displacement of the device is obtained by the pivotal movement of the tape-guide device 18, 18' about a pivotal axis 54, 54' which extends in a plane perpendicular to the direction of displacement and to the axis of the spindle 22, 22'. Both pivotal movements of each tape-guide device 18, 18' about the fulcrum formed by the V-shaped positioning abutment 50, 50' are produced by the force exerted on the supporting member 19, 19' of the tape-guide device by the spring 45, 45', so that the two springs 45, 45' also perform this additional function.

For positioning each tape-guide device 18, 18' in the pivoting direction 51, 51' about the fulcrum formed by the V-shaped positioning abutment 50, 50' of each positioning device 46, 46', the positioning device 46, 46' and the tape-guide device 18, 18' comprise two spaced pairs of positioning abutments which co-operate with each other and which are operative in the direction of the arrow 51, 51' in which the tape-guide device 18, 18' pivots about the fulcrum. One pair of these positioning abutments is formed by the V-shaped positioning abutment 50, 50' and the spacer 23, 23', which each have two functions. The other pair of locating stops is formed by a projection 55, 55' of the positioning device 46, 46' arranged on the deck plate 47 and by a projection 56, 56' on the supporting member 19, 19' of the tape-guide device 18, 18'.

For positioning each tape-guide device 18, 18' which is pivoted about the fulcrum in the pivoting direction of the arrow 53, 53' the positioning device and the tape-guide device also comprise two spaced pairs of cooperating positioning abutments which are operative in the direction of the arrow 53, 53' in which the tape-guide device 18, 18' pivots about the fulcrum. One pair of positioning abutments comprises a positioning tab 57, 57' which projects from the positioning block 48, 48' and a positioning tab 58, 58' which projects from the supporting member 19, 19'. The other pair of these positioning abutments comprises a projection 59, 59' of the positioning device 46, 46' arranged on the deck plate 47. The positioning abutment on the tape-guide device 18, 18' which co-operates with the projection 59, 59' is formed by a curved end portion 60, 60' of the leaf spring 61, 61' which is accurately positioned on and secured to the supporting member 19, 19'. The curved end portion 60, 60' of the leaf spring 61, 61' cooperates with a set screw 62, 62' in the supporting member 19, 19', by means of which screw the curved end-portion 60, 60' of the leaf spring 61, 61', which serves as positioning abutment can be adjusted relative to the supporting member 19, 19'.

As already stated, each tape-guide device 18, 18' is pivoted about the pivotal axes 52, 52' and 54, 54' in the two directions 51, 51' and 53, 53' under the influence of the spring 45, 45', after the spacer 23, 23' on the tape-guide device has engaged the V-shaped positioning abutment 50, 50' which is operative in the direction of movement and which forms a fulcrum for the tape-guide device. During this pivotal movement of the tape-guide device 18, 18' the pairwise cooperating positioning abutments which are operative in the directions of the arrows 51, 51' and 53, 53' abut each other with their contact surfaces substantially perpendicular to each other. This is the third and last stage in positioning the tape-guide device. Since during positioning the positioning abutments abut with each other substantially perpendicularly they do not slide relative to each other, so that the friction between the positioning abutments has no adverse effect on the positioning accuracy and reproducibility. Moveover, this minimizes the wear of the positioning abutments.

As a result of the pairwise cooperation of the positioning abutments 50, 50', 23, 23' and 55, 55', 56, 56' the inclined position of the tape-guide device 18, 18' is defined in a plane which extends in the direction of movement and perpendicularly to the axis 52, 52' of the tape-guide roller 20, 20'. As a result of the pairwise cooperation of the positioning abutments 57, 57', 58, 58' and 59, 59', 60, 60', the inclined position of the tape-guide devices 18, 18' is defined in a plane which extends in the direction of movement and through the axis 52, 52' of the tape-guide roller 20, 20'. Since this last-mentioned inclined position is well-defined it is obvious that the position of the tape-guide device, and in particular the tape guides 20, 20', 21, 21' on this device, relative to the tape 1 is also defined in the axial direction of the tape-guide roller 20, 20'. This is essential for the transverse guidance of the tape 1. After the pairwise co-operating positioning abutments have abutted with each other the force of the springs 45, 45' keeps them urged against each other as long as the tape-guide devices 18, 18' are in their operating positions, which is an additional function of the springs 45, 45'.

Since the tape-guide devices 18, 18' are positioned in three stages as described in the foregoing their operating positions are defined exactly and reliably and are always reproducible. This is of great importance for a correct guidance of the tape 1 by means of the tape guides 20, 20', 21, 21' of the tape guide devices 18, 18', in particular for the guidance around the tape-guide drum 2, because a constantly accurate and reproducible guidance of the tape is essential for a correct recording and reproducing process. The springs which act between the levers and the supporting members during this positioning process, which keep the coupling abutments of the disengageable couplings in engagement with each other and which tension the levers and the supporting members relative to each other, in order to define the positions, of the supporting members when the tape-guide devices are out of their operating positions are suitably also utilized for pivoting the tape-guide devices about the fulcra formed by the V-shaped recesses and for urging the tape-guide devices against the positioning devices, the relevant positioning abutments abutting pairwise with each other. This obviates the use of separate means for urging the tape-guide devices against the positioning devices, which lead to a more compact and simplified construction.

When the tape-guide devices 18, 18' are moved from their rest positions to their operating positions the tape 1 which is guided by the tape guides 20, 20', 21, 21' may exert such a force on the tape-guide devices 18, 18' that, against the force of the springs 45, 45', the supporting members 19, 19' of the tape-guide devices move relative to the arms 26, 26' which serve as drive members when the couplings 27, 27' are disengaged at least partly. This may, for example, happen when the tape 1 as it is unwound from one of the two reels in the cassette 10 briefly sticks to the roll of tape on this reel, so that a brief jerky movement of the supporting members relative to the arms occurs. Furthermore, as a result of a fault in the operation of the apparatus the motion of the tape 1 may be blocked completely, so that the supporting members 19, 19' remain displaced relative to the arms 26, 26' against the action of the springs 45, 45' all the time that this blocking persists.

In order to limit such a movement of the supporting members 19, 19' of the tape-guide devices 18, 18' relative to the arms 26, 26' used as drive members for the tape-guide devices against the force of the springs 45, 45' when the couplings 27, 27' are at least partly disengaged and the tape-guide devices 18, 18' are out of their operating positions, there are provided three pairs of cooperating limiting stops in the present case, one limiting stop of the pairwise co-operating limiting stops being arranged on the supporting member 19, 19'. This will be described in more detail hereinafter with reference to FIGS. 7 and 8.

Figure 7:
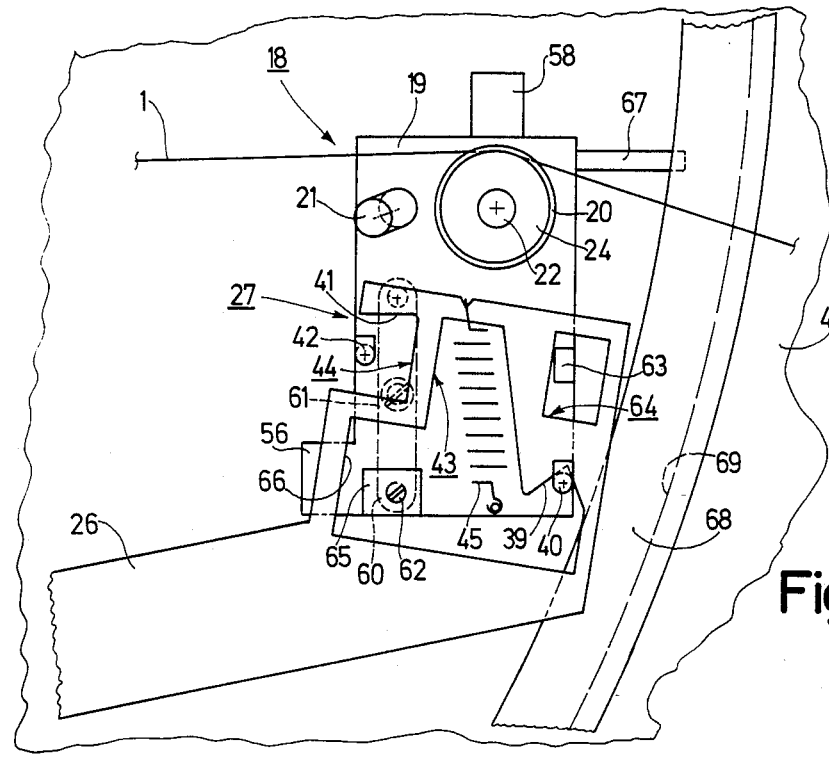
FIG. 7, in the same way as FIGS. 3 and 5, shows the tape-guide device shown in FIGS. 3 to 6 in an intermediate position just out of the rest position.

FIG. 7 shown a situation in which the tape-guide devices 18, 18', as they move from their rest positions to their operating positions, occupy intermediate positions just out of their rest positions, in which only the tape-guide rollers 20, 20' contact and drive the tape 1. It is assumed that the movement of the tape 1 is for example blocked briefly, so that the tape briefly exerts a force on the tape-guide devices 18, 18' through the tape-guide rollers 20, 20'. As a result of this force a pair of the pairwise cooperating coupling abutments, namely the coupling abutments 41, 41', 42, 42', are lifted off each other against the force of the springs 45, 45', the other pair of coupling abutments, namely the V-shaped recess 39, 39' and the cylindrical pin 40, 40' cooperating with this recess, being kept in engagement by the springs 45, 45'. Therefore, each supporting member 19, 19' then performs a pivotal movement about the cylindrical pin 40, 40' of the pair of coupling abutments comprising the V-shaped recess 39, 39' and the pin 40, 40'. For limiting this pivotal movement there is provided a first pair of limiting stops 63, 63', 64, 64'. Of this first pair one limiting stop arranged on the supporting member 19, 19' is formed by a projection 63, 63' of this member. The other limiting stop of this first pair is situated on the arm 26, 26' used as drive member and is formed by a third aperture 64 in the arm 26, 26', which aperture is engaged by the projection 63, 63'. For limiting such pivotal movement of the supporting member 19, 19' relative to the arm 26, 26' the projection 63, 63' simply abuts with a bounding wall of the third aperture 64, as is shown in FIG. 7. If the tape 1 no longer exerts a force on the tape-guide rollers 20, 20', the springs 45, 45' return the supporting members 19, 19' to their normal positions, the coupling abutments 41, 41', 42, 42' again engaging each other and the limiting stop 63, 63' being lifted off the limiting stop 64, 64'.

Figure 8:
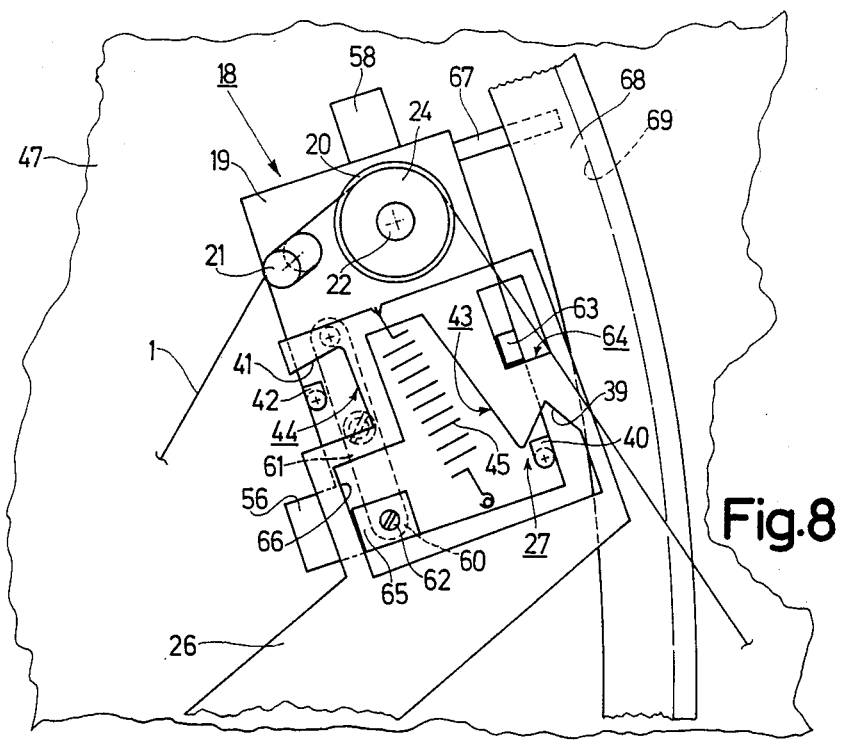
FIG. 8, in the same way as FIGS. 3, 5 and 7, shows the tape-guide device shown in FIGS. 3 to 7 in a further intermediate position just before the operating position is reached.

FIG. 8 shows a situation in which the tape-guide devices 18, 18', as they move from their rest portions to their operating positions, occupy intermediate positions just before the operating positions, in which intermediate positions both the tape-guide rollers 20, 20' and the tape-guide pins 21, 21' guide the tape 1. It is assumed that as a result of an irregularity in its transports the tape 1 exerts such a force on the tape-guide devices 18, 18' that the supporting members 19, 19' of these devices perform a sliding movement relative to the arms 26, 26' parallel to the major surfaces of these arms, the two pairs of coupling abutments 39, 39', 40, 40' and 41, 41', and 42, 42' again being lifted off each other against the action of the springs 45, 45' when the couplings 27, 27' are fully disengaged, as is shown in FIG. 8. This sliding movement is limited by means of two pairs of limiting stops. One of these two pairs of limiting stops is the first pair of limiting stops 63, 63', 64, 64' which is also used for limiting the pivotal movement described with reference to FIG. 7. One limiting stop of the second pair of limiting stops is a further projection 65, 65' on the supporting member 19, 19'. The other limiting stop of this second pair is situated on the arm 26, 26' and is formed by the first aperture 43, 43' in the arm 26, 26', which aperture engages with the further projection 65, 65'. For limiting such a sliding movement of a supporting member 19, 19' relative to the arm 26, 26', the projection 63, 63' simply engages with the relevant bounding walls of the third aperture 64, 64' near a corner and the further projection 65, 65' engages with the bounding wall 66, 66' of the first aperture 43, 43', as is shown in FIG. 8. If the tape 1 no longer exerts a force on the tape guides 20, 20', 21, 21', the springs 45, 45' return the supporting members 19, 19' to their normal positions, in which all coupling abutments again engage each other and the limiting stops 63, 63', 64, 64' and 65, 65', 66, 66' are disengaged from each other.

During the movement of each tape-guide device 18, 18' from its rest position to its operating position a further relative movement between the supporting member 19, 19' and the relevant arm 26, 26' may occur as a result of undesired influences of the tape 1 on the tape guides 20, 20', 21, 21', which relative movement is not indicated in the Figures. It may happen that as a result of irregularities in its movement the tape 1 exerts such a force on each tape-guide device 18, 18' that the supporting member 19, 19' is tilted relative to the relevant arm 26, 26' about a tilting axis, not shown, which extends through the two pairs of coupling abutments and substantially parallel to the major surface of each arm 26, 26', so that as a result of this tilting movement the cylindrical pins 40, 40', 42, 42' no longer fully engage with the V-shaped aperture 39, 39' and the flat abutment surface 41, 41' but are only in point-shaped contact with the aperture 39, 39' and the abutment surface 41, 41' against the force of the springs 45, 45' and with partly disengaged coupling 27, 27'. As a result of such a tilting movement the tape guides 20, 20', 21, 21' on the supporting member 19, 19' are moved in a direction away from the deck plate 47. For limiting this tilting movement there is provided a third pair of limiting stops. Of this third pair one limiting stop is again arranged on the supporting member 19, 19' and is formed by a limiting pin 67, 67' which projects from this member. The other limiting stop of this third pair is stationarily arranged on the apparatus in the path of movement of each tape guide device 18, 18', in a rail 68, 68' which extends along the entire path of movement of the tape-guide device. The rail 68, 68' is formed with a groove 69, 69' which also extends along the entire path of movement of the tape-guide device and whose lateral surface 70, 70' facing the arm 26, 26' forms the other limiting stop of the first pair of limiting stops. The free end of the limiting pin 67, 67' engages the groove 69, 69' to cooperate with the laternal surface 70, 70' of the groove 69, 69' which functions as stop surface for the limiting pin.

It is to be noted that the groove 69, 69' comprises a widened portion at its end nearest the operating position of the tape-guide device, in which portion the limiting pin 67, 67' engages when the tape-guide device is in its operating position. This guarantees that when the tape-guide device 18, 18' is positioned by means of the positioning device 46, 46' the groove 69, 69' cannot cooperate with the limiting pin 67, 67', so that it cannot impair a correct positioning of the tape-guide device in its operating position. For limiting such a tilting movement of a supporting member 19, 19' relative to the relevant arm 26, 26' the limiting pin 67, 67' simply engages with that lateral surface 70, 70' of the groove 69, 69' which faces the arm 26, 26' and which serves as a stop surface. When the tape no longer exerts an undesired force on the tape guides each supporting member returns to its normal position under the influence of the spring 45, 45', the coupling abutments again correctly engaging with each other and the limiting pin 67, 67' again being clear of the lateral surface 70, 70' of the groove 69, 69'.

The presence of three pairs of limiting stops ensures that all relative movements between the supporting members 19, 19' and the arms 26, 26' caused by an incorrect tape motion are kept within permissible limits. This precludes an excessive displacement of the supporting members relative to the arms, and also guarantee a correct guidance of the tape if, for example, the tape transport is disturbed briefly. This limited movement also prevents the supporting members from being disengaged fully from the arms when, for example, the tape transport is blocked completely. The construction of the limiting stops is capable of taking up comparatively great forces.

As will be apparent from the foregoing description the VCR apparatus in accordance with the invention as described with reference to FIGS. 1 to 8 has various advantages. However, it is to be noted in particular that the provision of springs which tension the supporting members and the arms relative to each other ensures an accurately defined position of the tape-guide devices when they are out of their operating positions and an exact positioning when they are in their operating positions in a particularly simple manner without the use of separate aids. This results in a simple, compact and reliable overall construction.

The second embodiment of the apparatus in accordance with the invention, in the same way as the apparatus described in the foregoing, comprises two identically constructed tape-guide devices. However, for the sake of simplicity only the tape-guide device 18 is shown in FIGS. 9 to 12, for which reason the following description only refers to this tape-guide device. The tape-guide device 18 comprises a block-shaped supporting member 19 for a tape guide roller 20 and a tape-guide pin which is inclined relative to this member. For coupling the supporting member 19 to the arm 26 used as drive member, there is provided a disengageable coupling 27, which in the present case is constructed in a very simple manner and only comprises a pair of co-operating coupling abutments 72 and 73 which face each other and which act in the direction of movement of the tape-guide device 18. The two coupling abutments each comprise a wedge-shaped projection, the projection 72 being formed on the arm 26 and the projection 73 on the supporting member 19. For mounting the supporting member 19 on the arm 26, the part of the supporting member 19 on which the wedge-shaped projection 73 is arranged is fitted into an aperture 74 in the arm 26, after which the supporting member 19 with its projection 73 is slid parallel to the major surface of the arm 26 towards the projection 72 on the arm 26. In the engaged condition of the coupling 27 the two projections 72 and 73 engage with each other and thereby form the disengageable connection between the arm 26 and the supporting member 19, as is shown in FIG. 10.

For tensioning the arm 26 and the supporting member 19 relative to each other in the direction of movement of the tape guide device 18 there is provided a spring clip 75 in the form of a wire spring, whose turns are slid onto a pin 76 on the lever 26 under pre-tension. One limb 77 of the spring 75 acts on a projection 78 formed on the arm 26 and the other limb 79 of the spring acts on an end wall 80 of the supporting member 19. As a result of this, a force which acts substantially in the direction of movement is exerted on the supporting member. In this simple manner the arm 26 and the supporting member 19 are tensioned relative to each other substantially without backlash in the direction of movement, the coupling abutments 72 and 73 of the disengageable coupling 27 being always urged against each other when the tape-guide device 18 is out of its operating position, as can be seen in the FIGS. 9 and 10, in which the tape guide device is shown in its rest position. Also in this case the position of the tape-guide device is defined directly and in a particularly simple and compact manner by the arm which functions as drive member, both in the rest position and during the movement between the rest position and the operating position.

For positioning the tape-guide device in its operating position the positioning block 48 of the positioning device 46 is formed with a U-shaped positioning groove 81 which extends substantially transversely of the direction of movement of the tape-guide device and parallel to the major surface of the arm 26. The block 48 has upper and lower laterally extending surfaces 82 and 83 which cooperates with the two surfaces 84 and 85 of the supporting member briefly before the operating position is reached, during a first stage in positioning the tape-guide device. In order to guarantee a smooth and reliable insertion of the supporting member 19 into the positioning groove 81, a ramp surface 86 adjoins the laterally extending surface 82 of the positioning groove. This ramp surface 86 lifts the supporting member 19 slightly away from the arm 26 during the movement of this supporting member. After the supporting member 19 has engaged the positioning groove 81 it is slid so far into the groove with its end wall 87 which faces the previously mentioned end wall 80 that is abuts with the bottom surface 88 of the groove 81 at the same time a positioning wedge 89 on the wall 87 engages a V-shaped locating recess 90 which terminates in the bottom surface 88 of the groove 81. This constitutes the second and last stage in positioning the tape-guide device. By thus positioning the tape-guide device in two stages this device is positioned accurately and reliably, as is shown in the FIGS. 11 and 12, in which the tape-guide device is shown in its operating position.

The arm 26 is again moved with overtravel relative to the supporting member 19, as can be seen in the FIGS. 11 and 12. During this overtravel the coupling 27 is disengaged, the two wedge-shaped coupling abutments 72 and 73 being lifted off each other against the action of the spring 75. This again ensures that the arm 26 has no influence on the tape-guide 18 which is in its operating position, thus permitting accurate and reproducible positioning of this device. As a result of the overtravel the spring 75 is tensioned further and keeps the tape-guide device 18, which is in its operating position, urged against the positioning device 46 in an absolutely reliable manner. Thus, the spring 75 now also has two functions.

Within the scope of the invention several modifications to the embodiments described in the foregoing will be obvious to those skilled in the art. This applies in particular to the construction of the disengageable coupling, which may alternatively comprise two pairs of coupling abutments, which may be disposed on a straight line which extends transversely of the direction movement. Various constructions are also possible for the pairwise co-operating coupling abutments. Further, different tension springs may be used or two or more springs may be employed.

Obviously, there are several possibilites for the construction of the positioning device. For example, in the same way as in the first embodiment of the apparatus as described with reference to the FIGS. 1 to 8, an abutment which is operative in the direction of movement and which forms a bearing surface for the tape-guide device may be formed by a separate abutment instead of by a positioning abutment which also performs a second function. Alternatively, the tape-guide device may be pivotable about this bearing surface under the influence of the spring only in a direction transverse to the direction of movement of the tape-guide device, the tape-guide device being positioned by only two positioning abutments which are operative in this direction.

It is obvious that several positioning abutments may be adjustable. In the second embodiment of the apparatus described with reference to FIGS. 9 to 12 it is alternatively possible to provide limiting stops for limiting a movement of the supporting members relative to the drive members in the same way as in the apparatus shown in FIGS. 1 to 8.

Clearly, the drive members need not be constructed as pivotal arms but alternatively as slide members which are slidable in guides, as is for example known from the previously mentioned Austrain Pat. No. 362,161, or as rings which are rotatable relative to each other and which are arranged to be substantially concentric with the tape-guide drum. Alternatively, there may be provided only one tape-guide device, which is for example guided along a path of movement which is defined by the relevant drive member and which extends around the tape-guide drum as a crescent-shaped path. There are also alternatives for driving the arm, such as gear-wheel drives, toothed-belt drives or cable drives. It is evident that the tape need not necessarily be contained in a cassette placed in the apparatus.

What is claimed is:

1. A helical scan tape recorder, comprising
at least one tape-guide device, comprising at least one tape guide arranged on a supporting member,
means for moving said tape-guide device between a rest position and an operating position along a predetermined path of movement, comprising a drive member, and a driving device for the drive member,
a positioning device for positioning said tape-guide device in its operating position,
means for keeping the tape-guide device in force-sustained engagement with the positioning device when in the operating position,
disengageable means for coupling the supporting member to said means for moving, comprising facing coupling abutments which act in a direction of movement of the tape-guide device; said disengageable means being arranged such that said tape-guide device and means for moving are in force-sustained engagement with each other during movement of the tape-guide device, and are disengaged from each other in the operating position of the tape-guide device,
characterized in that said disengageable means comprises at least one spring acting between said drive member and said supporting member, and tensioning the drive member and supporting member relative to each other substantially in the direction of movement,
said disengageable means is arranged such that said spring maintains said coupling abutments in force-sustained engagement with each other when a tape-guide device is out of its operating position, and
said spring keepts the tape-guide device in force-sustained engagement with the positioning device when the tape guide device is in its operating position, said drive member being moved with an over-travel relative to the supporting member when said coupling abutments are disengaged.

2. A recorder as claimed in claim 1, characterized in that the positioning device for the tape-guide device comprises an abutment arranged to be operative substantially in the direction of movement of the tape guide device.
said positioning device abutment forms a fulcrum for the tape-guide device, about which fulcrum the tape-guide device is pivotable in at least one pivoting direction substantially transversely to the direction of movement,
said spring biases said tape-guide device pivotally about said fulcrum when in its operating position, and
the positioning device and the tape guide device comprise at least two pairs of positioning abutments operative substantially opposite the direction in which said spring biases the tape-guide device about the fulcrum, for positioning the pivoted tape-guide device in its operating position; said at least two pairs of positioning abutments being spaced from each other and arranged to cooperate with each other.

3. A recorder as claimed in claim 2, characterized in that the positioning device abutment, which forms a fulcrum for the tape-guide device and is operative in the direction of movement, is formed by one positioning abutment of a pair of positioning abutments provided on the positioning device.

4. A recorder as claimed in claim 1, characterized by comprising at least one pair of cooperating limiting stops, one limiting stop of said at least one pair being disposed on the supporting member and arranged to limit movement of the supporting member relative to the drive member when the tape guide is out of its operating position and the disengageable means is at least partly disengaged against the force of the spring.

5. A recorder as claimed in claim 4, characterized in that the other limiting stop of said at least one pair of limiting stops is arranged on the drive member.

6. A recorder as claimed in claim 4, characterized in that the other limiting stop of said at least one pair of limiting stops is a stationary stop arranged on the recorder in the path of movement of the tape-guide device.

7. A recorder as claimed in claim 6, characterized in that the other limiting stop is formed as a stop surface which extends along substantially the entire path of movement of the tape-guide device.

8. A recorder as claimed in claim 1, characterized in that said spring is a helical spring loaded in tension substantially in the direction of movement, and said spring has one end attached to the drive member and another end to the supporting member.

9. A recorder as claimed in claim 1 or 8, characterized by comprising two pairs of said coupling abutments, spaced from each other in a direction parallel to the direction of movement of the tape-guide device.

10. A recorder as claimed in claim 9, characterized in that said two pairs of coupling abutments are also spaced from each other transversely to said direction parallel to the direction of movement of the tape guide device.

11. A recorder as claimed in claim 9, characterized in that one pair of coupling abutments comprises one abutment formed with a substantially V-shaped recess, the other coupling abutment being a cylindrical pin arranged to engage the V-shaped recess.

12. A recorder as claimed in claim 11, characterized in that at least one of said cylindrical pins has a shoulder at a free end overhanging the other member of the coupled pair.

13. A recorder as claimed in claim 11, characterized in that the other pairp of coupling abutments comprises a flat abutment surface and a cylindrical pin arranged to cooperate with the flat abutment surface.

14. A recorder as claimed in claim 13, characterized in that said drive member and said supporting member are members of a coupled pair; the two cylindrical pins are both arranged on one of the members of the coupled pair, and the V-shaped recess and flat abutment surface are formed on the other of the members of the coupled pair.

15. A recorder as claimed in claim 14, characterized in that the drive member has a plate-shaped end; the V-shaped recess and flat abutment surface are formed by bounding walls of at least one aperture formed in the plate-shaped end; and the cylindrical pins of the supporting member extend through said at least one aperture.

16. A recorder as claimed in claim 15, characterized in that at least one of said cylindrical pins has a shoulder at a free end overhanging the other member of the coupled pair.

17. A recorder as claimed in claim 16, characterized in that the positioning device for tape-guide device comprises an abutment arranged to be operative substantially in the direction of movement of the tape guide device,
- said positioning device abutment forms a fulcrum for the tape-guide device, about which fulcrum the tape-guide device is pivotable in at least one pivoting direction substantially transversely to the direction of movement,
- said spring biases said tape-guide device pivotally about said fulcrum when in its operating position, and
- the positioning device and the tape guide device comprise at least two pairs of positioning abutments operative substantially opposite the direction in which said spring biases the tape-guide device about the fulcrum, for positioning the pivoted tape-guide device in its operating position; and at least two pairs of positioning abutments being spaced from each other and arranged to cooperate with each other.

18. A recorder as claimed in claim 17, characterized by comprising at least one pair of cooperating limiting stops, one limiting stop of said at least one pair being disposed on the supporting member and arranged to limit movement of the supporting member relative to the drive member when the tape guide is out of its operating position and the disengageable means is at least partly disengaged against the force of the spring.

19. A recorder as claimed in claim 18, characterized in that the other limiting stop of said at least one pair of limiting stops is arranged on the drive member.

20. A recorder as claimed in claim 18, characterized in that the other limiting stop of said at least one pair of limiting stops is a stationary stop arranged on the recorder in the path of movement of the tape-guide device.

21. A recorder as claimed in claim 20, characterized in that the other limiting stop is formed as a stop surface which extends along substantially the entire path of movement of the tape-guide device.

* * * * *